(12) United States Patent
Ajith Kumar et al.

(10) Patent No.: US 10,185,643 B2
(45) Date of Patent: *Jan. 22, 2019

(54) CALL CHAIN INTERVAL RESOURCE IMPACT UNIFICATION

(71) Applicant: Microsoft Technology Licensing, LLC, Redmond, WA (US)

(72) Inventors: Harikrishna Menon Ajith Kumar, Bellevue, WA (US); Max Williams Brister, Seattle, WA (US); Ahmad Khalifa Eesa Ahmad, Sammamish, WA (US); David W. Shoots, Hollis, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/877,153

(22) Filed: Oct. 7, 2015

(65) Prior Publication Data
US 2016/0026556 A1 Jan. 28, 2016

Related U.S. Application Data

(63) Continuation of application No. 14/259,736, filed on Apr. 23, 2014, now Pat. No. 9,183,116.

(51) Int. Cl.
G06F 9/44 (2018.01)
G06F 11/36 (2006.01)
G06F 11/34 (2006.01)

(52) U.S. Cl.
CPC ...... G06F 11/3636 (2013.01); G06F 11/3466 (2013.01); G06F 11/3471 (2013.01);
(Continued)

(58) Field of Classification Search
CPC ............ G06F 11/3636; G06F 11/3466; G06F 11/3464; G06F 11/3471; G06F 11/366
See application file for complete search history.

(56) References Cited

U.S. PATENT DOCUMENTS 7,434,206 B2 10/2008 Seidman et al.
9,021,444 B2 2/2015 Garrett et al.
(Continued)

OTHER PUBLICATIONS

Tony Hoare and John Wickerson, Unifying models of data flow, 2011, retrieved online on Sep. 12, 2018, pp. 1-20, Retrieved from the Internet: <URL: https://johnwickerson.github.io/papers/unifyingmodelsofdataflow.pdf>. (Year: 2011).*
(Continued)

*Primary Examiner* — Hanh Thi-Minh Bui
(74) *Attorney, Agent, or Firm* — Ogilvie Law Firm (57) ABSTRACT

Embodiments profile usage of memory and other resource. Stack traces have lifespans, resource impacts, and constituent call chains. Aggregation unifies shared call chains and sums resource impacts after assigning traces to snapshot sets based on trace lifespans and user-defined snapshot request timestamps. Traces are assigned using either active aggregation or precursor aggregation. Traces spanning a snapshot request may be split. A sampled resource trace lifespan begins when the resource is sampled and ends at the next snapshot request. An allocated resource trace lifespan begins when a portion of the resource is allocated and ends when the allocated portion is freed. Resource portions not yet freed are implicitly freed when program execution ends. Call chain interval resource impact aggregation performed with multiple snapshot requests and stack trace sets creates snapshot aggregations. Two aggregations are differenced by subtracting the summed call chain resource impacts of one aggregation from those of another aggregation.

20 Claims, 3 Drawing Sheets

(52) U.S. Cl.
CPC ........ *G06F 11/3612* (2013.01); *G06F 11/362* (2013.01); *G06F 11/366* (2013.01); *G06F 11/3664* (2013.01); *G06F 2201/835* (2013.01); *G06F 2201/865* (2013.01)

(56) References Cited

U.S. PATENT DOCUMENTS

| | | | | |
|---|---|---|---|---|
| 2004/0111706 | A1* | 6/2004 | Mogul | G06F 11/3636 717/127 |
| 2004/0216091 | A1 | 10/2004 | Groeschel | |
| 2005/0204342 | A1 | 9/2005 | Broussard | |
| 2008/0263044 | A1 | 10/2008 | Cantrill | |
| 2009/0328007 | A1 | 12/2009 | Chen et al. | |
| 2010/0017791 | A1* | 1/2010 | Finkler | G06F 11/3409 717/158 |
| 2011/0072418 | A1 | 3/2011 | Kalamegham et al. | |
| 2011/0138366 | A1 | 6/2011 | Wintergerst et al. | |
| 2011/0214109 | A1 | 9/2011 | Pedersen | |
| 2012/0084759 | A1 | 4/2012 | Candea et al. | |
| 2012/0284490 | A1* | 11/2012 | Ramaswamy | G06F 11/3037 712/227 |
| 2013/0016690 | A1 | 1/2013 | Jeong et al. | |
| 2013/0152047 | A1 | 6/2013 | Moorthi et al. | |
| 2015/0052406 | A1* | 2/2015 | Garrett | G06F 11/1448 714/45 |

OTHER PUBLICATIONS

Manfred Schmidt-Schau and David Sabel, Unification of Program Expressions with Recursive Bindings, 2016, ACM, retrieved online on Sep. 12, 2018, pp. 160-173. Retrieved from the Internet: <URL: http://delivery.acm.org/10.1145/2970000/2968603/p160-schmidt-schauss.pdf?>. (Year: 2016).*

"Introduction to Profiling Java Applications in NetBeans IDE", Published on: Aug. 5, 2009 Retrieved from: https://netbeans.org/kb/docs/java/profiler-intro.html (copy submitted in U.S. Appl. No. 14/259,736, filed Apr. 23, 2014).

Menon, Harikrishna, "Diagnosing Memory Issues with the New Memory Usage Tool in Visual Studio", Published on: Apr. 2, 2014 Retrieved from: http://blogs.msdn.com/b/visualstudioalm/archive/2014/04/02/diagnosing-memory-issues-with-the-new-memory-usage-tool-in-visual-studio.aspx (copy submitted in U.S. Appl. No. 14/259,736, filed Apr. 23, 2014).

"Comparing Data from Views and Query Results", Retrieved Date: Apr. 11, 2014 Retrieved from: http://pic.dhe.ibm.com/infocenter/isa/v4r1m0/index.jsp?topic=%2Fcom.ibm.java.diagnostics.memory.analyzer.doc%2Fcomparingdata.html (copy submitted in U.S. Appl. No. 14/259,736, filed Apr. 23, 2014).

"The Flash Profiling Perspective and Profiler Views", Published on: May 7, 2011 Retrieved from: http://help.adobe.com/en_US/flashbuilder/using/WSe4e4b720da9dedb5510654d812e4d126514-8000.html#WS6f97d7caa66ef6eb1e63e3d11b6c4d0d21-7ef2 (copy submitted in U.S. Appl. No. 14/259,736, filed Apr. 23, 2014).

"New and Noteworthy", Published on: Jun. 27, 2011 Retrieved from: http://www.eclipse.org/mat/1.1/noteworthy.html (copy submitted in U.S. Appl. No. 14/259,736, filed Apr. 23, 2014).

Crozon, Julien, "How to Troubleshot Native Memory Leaks on Windows: GFlags and UMDH", Published on: Aug. 9, 2011 Retrieved from: http://bugslasher.net/2011/08/09/how-to-troubleshot-native-memory-leaks-on-windows-gflags-and-umdh/ (copy submitted in U.S. Appl. No. 14/259,736, filed Apr. 23, 2014).

"Profiling memory performance", Published on: May 7, 2013 Retrieved from: https://developers.google.com/chrome-developer-tools/docs/heap-profiling (copy submitted in U.S. Appl. No. 14/259,736, filed Apr. 23, 2014).

"Common In-Depth Analysis Issues", Published on: Feb. 29, 2012 Retrieved from: http://msdn.microsoft.com/en-us/library/windows/hardware/hh825311.aspx (copy submitted in U.S. Appl. No. 14/259,736, filed Apr. 23, 2014).

"CPU Analysis", Published on: Oct. 20, 2013 Retrieved from: http://msdn.microsoft.com/en-us/library/windows/hardware/jj679884.aspx (copy submitted in U.S. Appl. No. 14/259,736, filed Apr. 23, 2014).

"Dynamic Performance Analysis: Rules and Guidance for Visual Studio Profiling Tools Users", Published: May 2010 Retrieved from: http://msdn.microsoft.com/en-us/library/ff678495 (copy submitted in U.S. Appl. No. 14/259,736, filed Apr. 23, 2014).

"How to: Use CLR Profiler", Published: May 2004 Retrieved from: http://msdn.microsoft.com/en-us/library/ff650691.aspx (copy submitted in U.S. Appl. No. 14/259,736, filed Apr. 23, 2014).

"Investigating Memory Leaks in Azure Web Sites with Visual Studio 2013", Published on: Dec. 20, 2013 Retrieved from: http://blogs.msdn.com/b/visualstudioalm/archive/2013/12/20/investigating-memory-leaks-in-azure-web-sites-with-visual-studio-2013.aspx (copy submitted in U.S. Appl. No. 14/259,736, filed Apr. 23, 2014).

"JavaScript Memory Profiling", Published on: Feb. 10, 2014 Retrieved from: https://developers.google.com/chrome-developer-tools/docs/javascript-memory-profiling (copy submitted in U.S. Appl. No. 14/259,736, filed Apr. 23, 2014).

"Memory State Comparison", Published no later than: Apr. 7, 2014 Retrieved from: http://msdn.microsoft.com/en-us/library/5tz9b54s(v=vs.90).aspx (copy submitted in U.S. Appl. No. 14/259,736, filed Apr. 23, 2014).

Sasha Goldshtein et al., "Pro .NET Performance: Optimize your C# Applications", Published: 2012, Springer Science+Business Media, New York NY, 361 pages, Retrieved from: http://pdf.th7.cn/down/files/1312/pro_.net_performance.pdf (copy submitted in U.S. Appl. No. 14/259,736, filed Apr. 23, 2014).

"Profiling (computer programming)", Published: Mar. 28, 2014 Retrieved from: http://en.wikipedia.org/wiki/Profiling_(computer_programming) (copy submitted in U.S. Appl. No. 14/259,736, filed Apr. 23, 2014).

"Using Visual Studio 2013 to Diagnose .NET Memory Issues in Production", Published: Jun. 20, 2013 Retrieved from: http://blogs.msdn.com/b/visualstudioalm/archive/2013/06/20/using-visual-studio-2013-to-di . . . (copy submitted in U.S. Appl. No. 14/259,736, filed Apr. 23, 2014).

"Overview of Visual Studio 2013 updates", Published: Apr. 2, 2014 Retrieved from: http://support.microsoft.com/kb/2829760 (copy submitted in U.S. Appl. No. 14/259,736, filed Apr. 23, 2014).

"How to Record Heap Snapshots—Web Fundamentals", Retrieved from <<https://developers.google.com/web/tools/profile-performance/memory-problems/heap-snapshots>>, 10 pages, no later than Oct. 6, 2015.

Diego Caminha B. de Oliveira et al., Systematic Debugging of Concurrent Systems Using Coalesced Stack Trace Graphs, 2014, retrieved online on Jul. 9, 2015, pp. 1-16. Retrieved from the Internet: <URL: http://www.sci.utah.edu/publications/Oli2014a/OliveiraLCPC2014.pdf>. (copy cited by Office in U.S. Appl. No. 14/259,736, filed Apr. 23, 2014).

Huxing Zhang et al., Detecting Resource Leaks through Dynamical Mining of Resource Usage Patterns, IEEE, 2011, retrieved online on Jul. 9, 2015, pp. 265-270. Retrieved from the Internet: <URL: http://ieeexplore.ieee.org/stamp/stamp.jsp?tp=&arnumber=5958824>. (copy cited by Office in U.S. Appl. No. 14/259,736, filed Apr. 23, 2014).

* cited by examiner

CALL CHAIN INTERVAL RESOURCE IMPACT UNIFICATION

RELATED APPLICATION

The present application claims priority to, and incorporates herein by reference the entirety of, U.S. patent application Ser. No. 14/259,736 filed Apr. 23, 2014.

BACKGROUND

Profilers are software development tools that measure aspects of software program behavior. Familiar profilers are used to collect and/or analyze data to help answer questions such as which routines of a program are using the most processor cycles, which routines are using the most memory, and whether all of the memory allocated by the program is also being freed after it is no longer needed for useful work in the program. Profilers are often used to help improve program performance.

The program behavior data which is collected for profiling may include stack traces, other recorded events, program variable values at one or more points in time, operating system and/or other runtime environment state at one or more points in time, and statistics summarizing such data, for example. Data may be collected directly by the profiler, or it may be collected by another tool and then fed to the profiler for analysis and display. Program behavior data for profiling may be collected by using hardware interrupts, code instrumentation, processor or runtime simulation or emulation, operating system hooks, performance counters, and/or logging tools, for example.

SUMMARY

Some embodiments are directed to the technical problem of profiling memory usage by code for which object data type info is not readily available. Some embodiments are directed to the technical problem of analyzing stack traces based on user-defined points of interest during a profiled program's execution. Some embodiments are directed to the technical problem of distinguishing between allocated resources and sampled resources during profiling. Some embodiments are directed to the technical problem of identifying causes for unexpected growth in computational resource usage, in terms of either absolute count or relative size. Other technical problems are also addressed.

In connection with some embodiments, stack traces are recorded during program execution when a resource is sampled, allocated, freed, or consumed. Each sampling or allocation stack trace has a timestamp, has a resource impact, and defines a set of constituent call chains. For example, a stack trace ABCD which allocates 10 bytes of memory defines constituent call chains A, AB, ABC, and ABCD, each having resource impact +10. As another example, in some embodiments sampling stack traces each have impact 1 when sampling CPU usage; a stack trace AB which samples CPU usage then defines constituent call chains A and AB, each having resource impact +1.

In some embodiments, call chain interval resource impact aggregation includes two phases. In a first phase, stack traces are assigned to a snapshot set. In some embodiments, a trace which spans a user-defined snapshot request position is split into two or more shorter traces which do not individually span any snapshot request; then each shorter trace is assigned to its own respective snapshot set. In a second phase, call chains within the stack traces of the snapshot set are unified and their respective resource impacts are summed.

In some embodiments, stack traces are assigned to a snapshot set in response to a snapshot request by using either active aggregation or precursor aggregation. Under active aggregation, a stack trace is part of a snapshot set for a snapshot request only if the request is made during the stack trace's lifespan; the set contains the stack traces which are active at the time of the snapshot request. Under precursor aggregation, a stack trace is part of a snapshot set when the snapshot request was made after the start of the stack trace's lifespan; the set contains all stack traces which started before the snapshot request, regardless of whether they are still active when the request is made. Precursor aggregation is sometimes referred to as "transient" aggregation. Under transient aggregation, an embodiment defines a transient snapshot set like the active aggregation snapshot set, except resource usage stack traces are included in the transient snapshot set only when the timestamp of that transient snapshot set occurs after the start of the specified resource usage trace's lifespan.

In some embodiments when analyzing sampled resources the lifespan of a stack trace begins when the resource is sampled by the routine at the top of the stack trace, and the stack trace lifespan ends when the next snapshot request is made. For allocated resources, the lifespan of a stack trace begins when a portion of the resource is allocated by the routine at the top of the stack trace, and the stack trace lifespan ends when the allocated portion is freed. All resource portions not yet freed are implicitly freed when program execution ends.

In some embodiments after stack traces are assigned to a snapshot set by active aggregation or precursor aggregation, the call chains of the stack traces in the set are unified by identifying shared call chains in traces, and their respective resource impacts are summed. For example, if a snapshot set contains trace ABC with resource impact +3 and trace ABD with resource impact +2 then the unified call chains of the set include ABC with impact +3, ABD with impact +2, AB with impact +5, and A with impact +5.

In some embodiments call chain interval resource impact aggregation can be performed with two or more snapshot requests and the stack traces that are relevant (under active aggregation or precursor aggregation, as the case may be) to each snapshot request, thereby creating two or more snapshot aggregations. Each snapshot aggregation includes unified call chains with respective resource impacts. In some embodiments, two snapshot aggregations are differenced by subtracting the call chain resource impacts of one aggregation (typically the earlier one) from the respective call chain resource impacts of another aggregation. If a call chain appears in one aggregation but not in the other aggregation, it is implied in the other aggregation and given an implied resource impact of zero. Aggregation difference results can then be presented to a developer though a tool user interface.

Computational resources whose usage can be analyzed in ways described above and elsewhere herein include, for example, memory usage by a native code portion of a software program, memory usage by a managed code portion of the software program, allocated heap memory usage, processor usage, thread activity, nonvolatile storage subsystem usage, network interface usage, electrical power usage, peripheral device usage, allocated resource usage, sampled uniformly weighted resource usage, or sampled proportionately weighted resource usage. Heap memory and disk space are two of the many possible examples of allocated resources. Sampling a CPU, a graphics processor, a numeric coprocessor, or another processor and giving each sample the same weight is an example of sampling uniformly weighted resource usage. Sampling the duration of ROM accesses, hard disk accesses, and other relatively long (compared to RAM access) operations are some examples of sampling proportionately weighted resource usage.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Managed memory often has associated type information, such as rich metadata tables, which provide a basis for creating heap graphs in memory profilers. By contrast, it has been difficult to reliably create heap graphs for native memory without undesirably massive instrumentation of the profiled code, due to the lack of type information and rich metadata tables normally available for heap memory that is used by native code. The lack of a heap graph makes it difficult to visualize the state of the heap at different points in time. Therefore inspecting the difference in size or count of a particular type of object becomes very difficult to do reliably. In response, some developers substitute debug versions of allocation functions in an effort to track allocations, but this is often tedious and also not desirable in production code.

Some embodiments described herein define sets of aggregated stack traces based on time. Some apply set operations in these snapshot sets to calculate relative growth in the count of objects and increase in size of one snapshot set relative to another snapshot set. For example, some embodiments implement snapshots in profiling resource allocation for stack based systems, e.g., for memory visualization to inspect the relative growth of object counts and sizes. Snapshots are defined by users (e.g., developers) and implemented either as points in time or as intervals in time. Set operations determine object counts and size growth attributed to each frame in a stack, and other information, leading to a better analysis of the state of memory than familiar stack based tools provide.

Applications can be made to emit traces whenever memory allocation is done, on behalf of the application process being profiled, and these traces are collected during application execution. Meanwhile, the user is encouraged to take snapshots, which represent the state of the application memory at that point and are implemented as a timestamp, or a time interval. At the end of a profiling session the profiler can have a large amount of traces that collectively define each and every allocation made in the application. Based on the user snapshot requests, some embodiments subdivide these traces based on the time the allocation was made. Then the profiler has a set of well-defined traces that correspond to the state of the application when the user requested a snapshot. The profiler aggregates these sets of traces based on the frames in their call stack. Then the user can ask for the difference (a.k.a. "diff") of any two of the snapshots. Some embodiments apply a union operation on the aggregated stacks and subtract the count and size of allocations attributed to them, and then present these results to the user as difference columns or values in a profiler user interface. This presentation can help the user understand the memory growth or leaks in the profiled application program.

Some embodiments described herein may be viewed in a broader context. For instance, concepts such as assignment, duration, impact, position, summation, and tracing may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving assignment, duration, impact, position, summation, and/or tracing are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as profiling memory usage by code for which object data type info is not readily available. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein analyze stack traces based on user-defined points of interest during a profiled program's execution. Third, technical effects provided by some embodiments include aggregations containing unified call chains and summed resource impacts. Fourth, some embodiments apply concrete technical means such as snapshot sets with active or precursor aggregation to obtain particular technical effects such as difference counts and difference amounts directed to the specific technical problem of identifying causes for unexpected growth in computational resource usage, thereby providing a concrete and useful technical solution.

Reference is made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

Some Acronyms

CCIRIAD: call chain interval resource impact aggregation differencing
CD: compact disc
DVD: digital versatile disk or digital video disc
ETW: event tracing for Windows
GUI: graphical user interface
RAM: random access memory
ROM: read only memory
XAML: extensible application markup language Additional Terminology The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications and their processes, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process").

Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as aggregating, allocating, analyzing, assigning, avoiding, calling, differencing, displaying, executing, freeing, getting, identifying, implying, indicating, noting, performing, producing, recording, requesting, sampling, splitting, subtracting, summing, tracing, unifying, (and aggregates, aggregated, allocates, allocated, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. No claim covers a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

Figure 1:
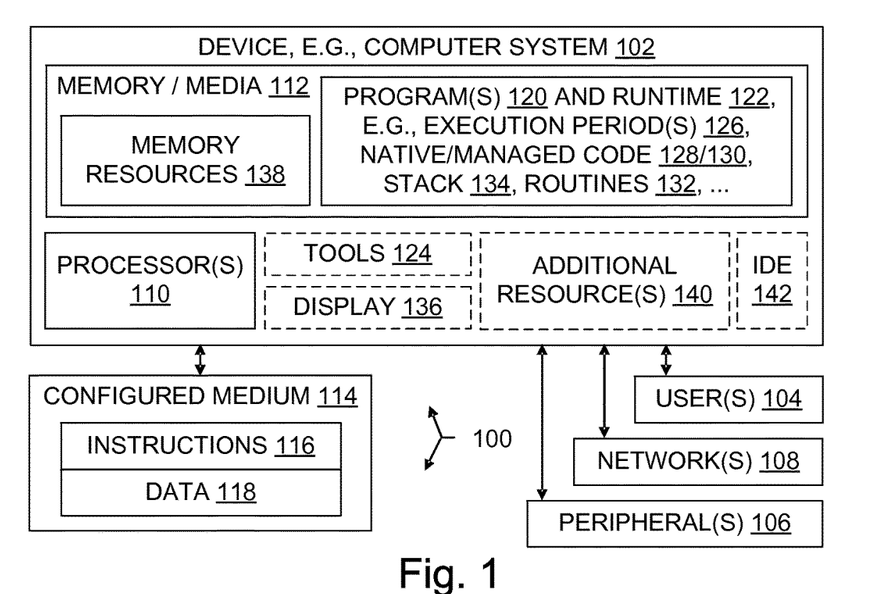
FIG. 1 is a block diagram illustrating a computer system having at least one processor and at least one memory which interact with one another under the control of a target program whose runtime behavior is to be profiled, and other items in an operating environment which may be present on multiple network nodes, and also illustrating configured storage medium (as opposed to a mere signal) embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

The term "memory" is used broadly herein to include RAM, flash, disk, and other digital memories. Stack traces can be read from or written to any such memory 112, code may be kept in any such memory during execution, and so on. Memory location has impact on implementation performance. But from a claim coverage perspective, it makes no difference whether the code of an embodiment that does the stack trace inspection is already in RAM or is read first from disk, or is read from several devices, for instance, and it does not matter whether the stack traces themselves are read from disk, read over a network connection, are already in RAM, or come from some combination of memory devices.

Although an embodiment may be described as being implemented as software instructions executed by one or more processors in a computing device (e.g., general purpose computer, smart phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, the behavior of one or more application programs 120 in one or more runtimes 122 will be profiled. The applications 120 being profiled may run on the same machine or set of machines as profiling tools 124, or not, and an execution period 126 of a profiled application may overlap the execution of a profiling tool, or not. An application 120 includes native code 128 and/or managed code 130 which contains routines 132.

During execution of the application, routines typically call themselves and/or call other routines, resulting in a call stack 134 at any given point in the execution period 126. Multithreaded applications often have multiple call stacks 134. During execution, the application 120 makes use of memory resources 138 such as heap memory and stack memory, and also normally makes use of other computational resources such as processor 110 cycles, network 108 interfaces, hard disks and other peripherals 106, and possibly additional resources 140.

The applications 120, runtimes 122, tools 124, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, display(s) 136, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 142 which provides a developer with a set of coordinated software development tools such as compilers, source code editors, profilers, debuggers, and so on. In particular, some of the suitable operating environments for some embodiments include or help create a Microsoft® Visual Studio® development environment (marks of Microsoft Corporation) configured to support program development; aspects of technology discussed herein are part of the Microsoft Visual Studio 2013 Update 2 RC. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment. FIG. 1 is provided for convenience; inclusion of an item in FIG. 1 does not imply that the item, or the describe use of the item, was known prior to the current innovations.

Systems

Figure 2:
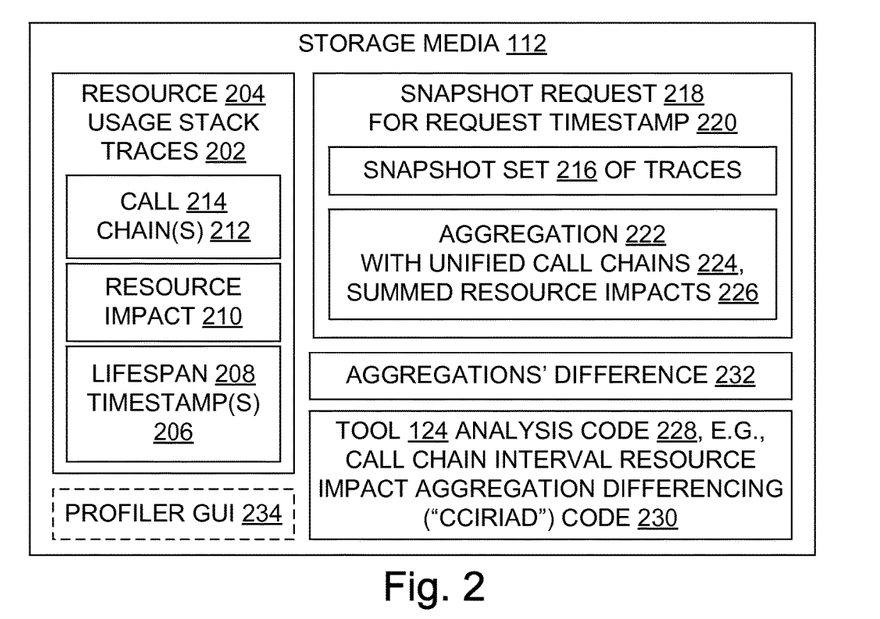
FIG. 2 is a block flow diagram illustrating in an example architecture some aspects of a particular genre of profiling defined herein as call chain interval resource impact aggregation differencing ("CCIRIAD")

FIG. 2 further illustrates aspects of an architecture which is suitable for use with some embodiments. Resource usage stack traces 202 are recorded during program 120 execution when a computational resource 204 is sampled, allocated, or freed. Resource usage stack traces 202 are a particular kind of stack 134 trace. Other stack traces may also be created, modified, and/or recorded during the program's execution as a result of activities which do not directly involve a profiled resource, but the focus in FIG. 2 is on stack traces that help document the usage of a computational resource 204. Computational resources 204 include peripherals 106, networks 108, processors 110, memory 112 resources 138, and/or other resources 140.

Those of skill understand that stack 134 traces in general document one routine 132 calling another routine, which then calls another routine, and so on to define a given chain of calls at a given time in the program's execution. The stack normally changes as the program executes. Consistent with this understanding, in some embodiments discussed herein each sampling or allocation stack trace 202 has a timestamp 206 indicating the start of its lifespan 208, has a resource impact 210, and has a set of constituent chains 212 of routine calls 214.

With regard to terminology, in general a stack trace can be identified by its timestamp and/or by the names of the routines that have been called and have not yet ended when the trace is recorded. In examples herein, single alphabet letters are used as routine names for convenience, with the understanding that in many implementations longer developer-defined names would be used. Routine names could be obtained from a symbol table, for instance, such as the symbol tables provided in .debug or .pdb format debugger files. Thus, in the examples a stack trace ABCD indicates that routine A called routine B which called routine C which called routine D, and that none of these routines had yet completed at the time the stack trace ABCD was made.

In some embodiments, resource usage stack traces 202 are assigned by a profiler tool 124 to a snapshot set 216 in response to a snapshot request 218. The snapshot request 218 has a request timestamp 220, which may be a timestamp assigned when the request 218 was received or a timestamp that was subsequently assigned by a user 104 regardless of when the request 218 was received. In other words, in some situations with some embodiments snapshot requests are made interactively while the profiled application 120 is running and traces are still being recorded, and in other situations with the same or other embodiments, snapshot requests are made after all the traces 202 of potential interest have been recorded. With regard to assigning traces to snapshot sets, however, a request 218 is effectively made at whatever time the request's timestamp 220 states the request is to be treated as having been made. Unless stated otherwise, "made" herein with respect to a snapshot request means "effectively made".

In some embodiments, production of a call chain interval resource impact aggregation 222 includes two phases. In a first phase, stack traces 202 are assigned to a snapshot set 216. In some embodiments, a trace which spans a user-defined snapshot request position (denoted by the request timestamp 220) is split into two or more shorter traces 202 which do not individually span any snapshot request; then each shorter trace is assigned to its own respective snapshot set. In a second phase, call chains 212 within the stack traces of the snapshot set are unified and their respective resource impacts 210 are summed.

In some embodiments, resource usage stack traces 202 are assigned by analysis code 228 of a profiler tool 124 to a snapshot set 216 by using either active aggregation or precursor aggregation. Under active aggregation, a stack trace 202 is part of a snapshot set 216 for a snapshot request 218 only if the request is effectively made during the stack trace's lifespan 208. As a consequence, the snapshot set contains the resource usage stack traces which are active at the timestamp 220 time assigned to the snapshot request. Under precursor aggregation, a stack trace 202 is part of a snapshot set when the snapshot request was effectively made after the start of the stack trace's lifespan 208. Consequently, the snapshot set contains all resource usage stack traces 202 which started before the snapshot request's assigned timestamp 220 time, regardless of whether such a trace is still active when the request 218 is effectively made.

To finish producing an aggregation 222 after stack traces are assigned to a snapshot set by active aggregation or precursor aggregation, some analysis code 228 embodiments unify the call chains of the stack traces in the set 216 by identifying shared call chains 212 in traces 202; their respective resource impacts 210 are summed. This produces unified call chains 224 with summed resource impacts 226. For example, if a snapshot set 216 contains trace ABC with resource impact +3 and trace ABD with resource impact +2 then the unified call chains 224 of the set include ABC with summed impact +3, ABD with summed impact +2, AB with summed impact +5, and A with summed impact +5.

In some embodiments, analysis code 228 includes call chain interval resource impact aggregation differencing code 230 which not only produces aggregations 222 but also produces aggregation differences 232. In some embodiments, two snapshot aggregations 222 are differenced by subtracting the call chain resource impacts 226 of one aggregation (typically but not necessarily the earlier one) from the respective call chain resource impacts 226 of another aggregation. If a unified call chain 224 appears in one aggregation but not in the other aggregation, that unified call chain 224 is implied in the other aggregation and given an implied resource impact 226 of zero. Aggregation difference results can then be presented to a developer though a tool user interface 234 such as a profiler GUI.

In some embodiments certain computational resources 204 are treated as sampled resources and others are treated as allocated resources. For example, processor cycles may be treated as a sampled resource and heap memory may be treated as an allocated resource, because processor cycles cannot be de-allocated (a.k.a. freed) once used, but memory bytes can be de-allocated and then re-used. In some embodiments, when the resource 204 is a sampled resource the lifespan 208 of a stack trace 202 begins when the resource is sampled by the routine 132 which is at the top of the stack trace (most recently called), and the stack trace lifespan 208 ends when the next snapshot request 218 is effectively made. For allocated resources 204, the lifespan 208 of a stack trace 202 begins when a portion of the resource is allocated by the routine 132 at the top of the stack trace, and the stack trace lifespan ends when the allocated portion of the resource 204 is freed for re-use. All allocated resource portions not yet freed are implicitly freed when program 120 execution ends.

With reference to FIGS. 1 and 2, some embodiments provide a computer system 102 with a logical processor 110 and a memory medium 112 configured by circuitry, firmware, and/or software to provide technical effects such as assigning resource usage stack traces to snapshot sets and producing aggregations 222 as described herein. In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, profiled applications 120 may execute on one or more devices/systems 102 in a networked cloud, resource usage stack traces 202 from those application executions may be stored on yet other devices within the cloud, and the analysis code 228 which receives snapshot requests 218 and analyzes the resource usage stack traces 202 may configure a display 136 on yet other cloud device(s)/system(s) 102.

Processes

Figure 3:
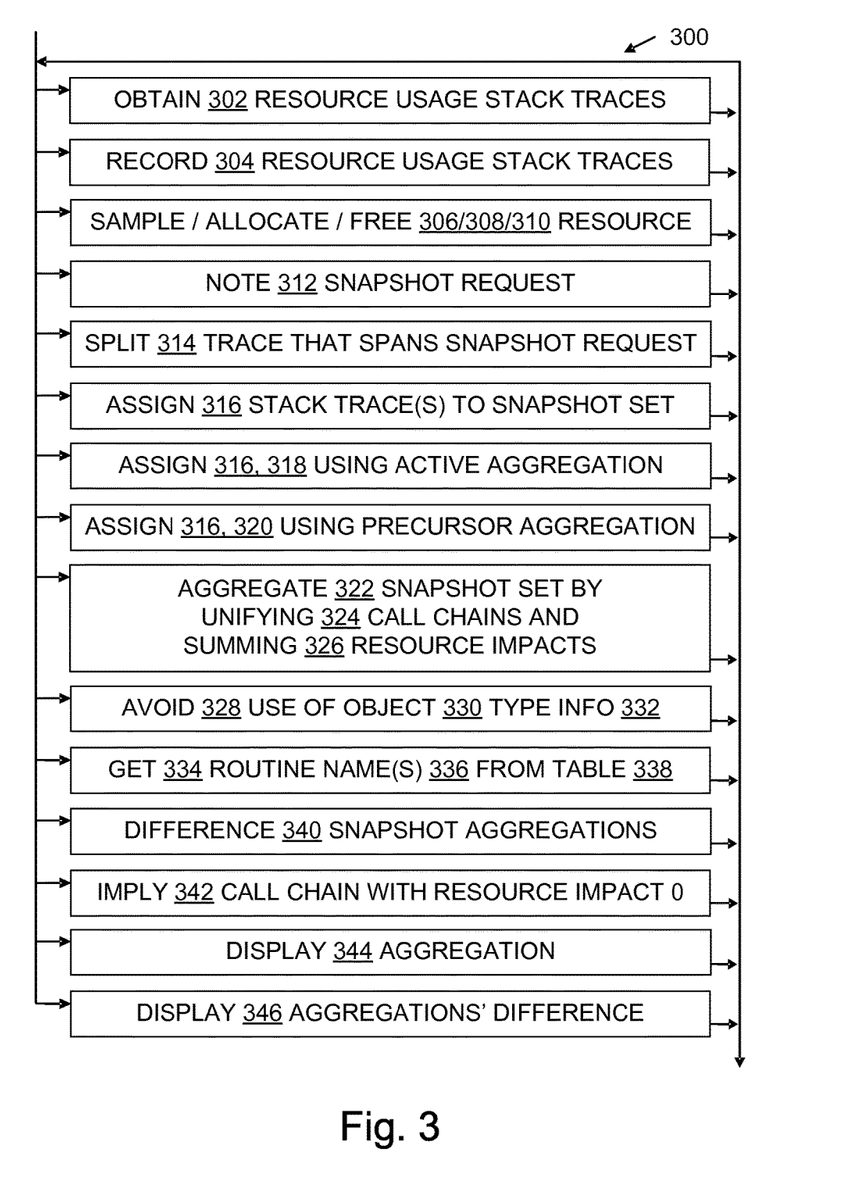
FIG. 3 is a flow chart illustrating steps of some process and configured storage medium embodiments which use some (but not necessarily all) of the aspects of CCIRIAD profiling, e.g., an aggregation may be formed but not be differenced in a given embodiment.

FIG. 3 illustrates some process embodiments in a flowchart 300. Technical processes shown in the Figures or otherwise disclosed may be performed in some embodiments automatically, e.g., by analysis code 228 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

During a stack trace obtaining step 302, an embodiment (or a user manipulating aspects of an embodiment) obtains resource usage stack traces 202. Step 302 may be accomplished by obtaining previously recorded 304 stack traces from a log file or other digital memory 112 after an application program 120 has finished execution, or by recording 304 stack traces in memory 112 during program execution. Recording 304 step may be accomplished using instrumentation, emulation, or another familiar mechanism, for example. Activities documented by the stack traces 202 typically include sampling 306 usage of a computational resource 204, allocating computational resource 204, and/or freeing (de-allocating) computational resource 204.

During a snapshot request noting step 312, an embodiment notes a snapshot request 218 and assigns the request a timestamp 220. Thus, an implementation of a snapshot request need not include any stack traces. In the examples set forth below, each snapshot request has a single timestamp, but in some embodiments snapshots are intervals rather than individual points in time. Timestamps 220 are stored in digital memory 112.

During a trace splitting step 314, a stack trace 202 whose lifespan 208 spans a snapshot request timestamp 220 is split into two traces 202 so that each trace can then be assigned to a different respective snapshot set 216. Trace splitting may be accomplished by creating a new trace data structure in memory with the same call chain as the spanning trace 202, and altering the lifespan of the spanning trace 202. For example, if a spanning trace ADF which samples a disk access starts at an application execution time 30 and ends at time 60, and a snapshot request is effectively made at time 50, then step 314 can produce one trace ADF with lifespan 30 to 50 and resource impact 20 and another trace ADF with lifespan 50 to 60 and resource impact 10.

During trace assigning steps 316, traces 202 are assigned to snapshot sets 216. One version of assignment step 316 uses active aggregation and is denoted herein as trace assigning 316 in the particular form of active aggregation trace assigning 318. Another version of assignment step 316 uses precursor aggregation and is denoted herein as trace assigning 316 in the particular form of precursor aggregation trace assigning 320. Step 316 may be accomplished by injecting snapshot timestamps into a list or table of traces 202, for example, or by segregating a list or table of traces 202 into separate snapshot sets 216 labeled by request timestamps 220, for example.

During some embodiments of an aggregating step 322, traces 202 assigned to a snapshot set 216 are aggregated by unifying 324 call chains 212 and by summing 326 the corresponding resource impacts 210. Step 322 may thus be accomplished by creating in memory 112 data structures which have the same form as the recorded traces 202 but have the unified call chains and summed resource impacts as their values instead of having only the recorded trace values. However "aggregating" is used broadly herein to refer to one or more of the following: assigning traces to a snapshot set 216, unifying the call chains of assigned traces, summing resource impacts of unified call chains. Unless otherwise clearly indicated, "aggregating" refers to unifying the call chains of assigned traces and summing resource impacts of the unified call chains.

Avoiding step 328 is shown as a separate step for the sake of convenience, with the understanding that in practice it indicates that the steps performed by a given embodiment omit reliance on using typing information 332 of objects 330 such as class instances. Step 328 thus emphasizes that some embodiments do not use, or at the least do not require, metadata such as class member names and object names; getting 334 the routine names 336 alone are sufficient. This freedom from reliance on metadata that is not readily available is advantageous when debugging or otherwise profiling native code 128 heap memory 138 usage, for example. Routine names 336 can generally be gotten 334 from a symbol table 338 in a debugging file by using familiar mechanisms. Some familiar debugging files include .debug files used in GNU® environments, and .pdb files used in Microsoft® environments, for example. (GNU is a registered mark of Free Software Foundation, Microsoft is a registered mark of Microsoft Corporation). A symbol table stored in an executable file is referenced in some embodiments.

During an aggregation differencing step 340, an embodiment differences (a.k.a. "diffs") two aggregations 222 to obtain size differences and/or count differences. Size differences are differences in allocated resource impacts 226. Count differences are differences in the number of allocated resource allocation calls, the number of allocated resource de-allocation calls, and/or the number of sampled resource impacts. If one aggregation 222 contains a particular unified call chain 224 and the other aggregation being diffed does not, then some embodiments omit the difference, some flag an error, and some imply 342 the existence of the missing unified call chain and imply 342 to it a resource impact of zero. Some embodiments display 346 aggregations 222 in a GUI 234, and some will also display 346 the diff results 232 in the GUI 234.

Figure 4:
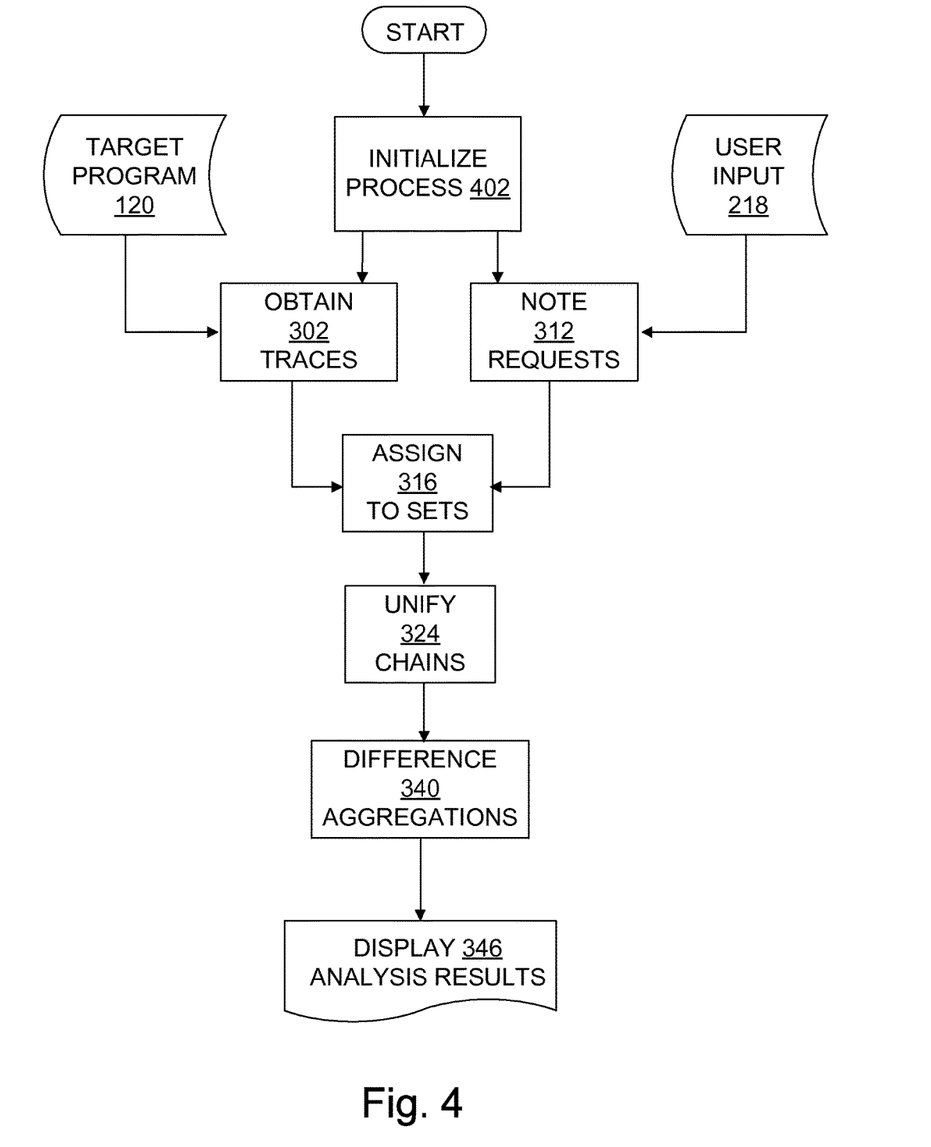
FIG. 4 is a data flow diagram illustrating aspects of CCIRIAD profiling in an example architecture.

FIG. 4 illustrates a data flow for some embodiments. A profiling analysis process is initialized 402 by opening a profiler tool 124, selecting a profile target application 120, selecting one or more computational resources 204, and performing other initialization steps as appropriate. For example, it may be appropriate to notify the tool 124 where the symbol tables 338 and traces 202 reside in storage, to verify file access permissions, to set GUI preferences, and so on. The embodiment then obtains 302 resource usage stack traces 202, and notes 312 one or more (but generally at least two) snapshot requests from the user. Then the embodiment assigns 316 resource usage stack traces 202 to one or more snapshot sets 216, and unifies the trace call chains 212. In this example, the embodiment also differences 340 two aggregations 222 and displays 346 the differences to the user. This is merely an example; other embodiments operate differently. For instance, some do not perform aggregation differencing 340; some display 346 only unified call chains, and some display 346 only summed resource impacts.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as unified call chains 224, summed resource impacts 226, snapshot sets 216, and/or aggregation differences 232, in the form of data 118 and instructions 116, read from a removable medium 114 and/or another source such as a network connection, to form a configured medium. The configured medium 112 is capable of causing a computer system to perform technical process steps for profiling with snapshot requests 218 and resource usage stack traces 202 as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Some Additional Examples

Additional details and design considerations are provided below. As with the other examples herein, the features described may be used individually and/or in combination, or not at all, in a given embodiment.

Sampled Processor Examples

To further illustrate profiling tools and techniques described herein, consider the following simplified example of profile analysis with a sampled 306 CPU 110. Stack traces 202 are labeled numerically in this and some other examples merely for discussion convenience; in an implementation traces might be labeled only by their timestamps 206. The traces 202 in this example include:

Stack trace #1 AB at timestamp 1
Stack trace #2 AB at timestamp 5
Stack trace #3 ABC at timestamp 6
Stack trace #4 ABC at timestamp 10
Stack trace #5 ABE at timestamp 12
Snapshot request #1 at timestamp 15
Stack trace #6 ABE at timestamp 18
Stack trace #7 AB at timestamp 22
Stack trace #8 AB at timestamp 25
Stack trace #9 AB at timestamp 30
Stack trace #10 ABD at timestamp 31
Snapshot request #2 at timestamp 40
. . . execution continues, program ends execution at timestamp 100

In this example, when snapshot #1 is requested the intervals for stack traces #1-5 are ended at timestamp 15. Likewise, when snapshot #2 is requested stack traces #6-10 are ended at timestamp 40. In CPU sampling all stack traces may be assigned the same weight, e.g., in this example each trace 202 has an impact value of 1.

First, consider results of using 318 active aggregation, that is, an aggregation 222 produced by assigning 316 traces 202 using active aggregation. Aggregating 318 the first snapshot set yields an aggregate trace AB with resource impact +5 (more precisely, an aggregation 222 trace with unified call chain AB having summed resource impact +5), an aggregate trace ABC with resource impact +2, and an aggregate trace ABE with resource impact +1. "Aggregate trace" here refers to a result of unifying 324 the call chains and summing 326 their resource impacts. Aggregating 318 the second snapshot yields aggregate trace AB with resource impact +5, aggegate trace ABE with resource impact +1, and aggregate trace ABD with resource impact +1. Diffing the two snapshot aggregations yields AB diff=+0, ABC diff=−2, ABE diff=+0, ABD diff=+1.

Now, consider results of using 320 precursor aggregation, also referred to as "transient" aggregation; these results include an aggregation 222 produced by assigning 316 traces 202 using precursor aggregation. Aggregating 320 the first transient snapshot set 216 yields aggregate trace AB with resources impact +5, aggregate trace ABC with resource impact +2, and aggregate trace ABE with resource impact +1. Aggregating 320 the second transient snapshot yields aggregate trace AB with resource impact +10, aggregate trace ABC with resource impact +2, aggregate trace ABE with resource impact +2, and aggregate trace ABD with resource impact +1. Diffing 340 the two transient snapshot aggregations yields AB diff=+5, ABC diff=+0, ABE diff=+1, ABD diff=+1.

Disk Usage and Similar Resource Examples

For resources such as ROM, CD, and DVD memory is not allocated and freed like it is in RAM. Instead of tracking the amount of memory 112 being used as with RAM, a developer may be interested in tracking the amount of time it takes to retrieve data from the peripheral 106. Tracking disk or ROM access time is done in a similar way to CPU sampling, except the sampled times are weighted proportionately by the duration of the access call 214. Additionally, one may split 314 resource accesses that occur across snapshot boundaries.

The following examples accordingly illustrate profiling a resource 204 which is sampled, but has weighted resource impacts rather than having the same value for each resource impact as was done in the sampled processor examples above. In these disk usage examples, resource impact is proportional to disk access time; similar considerations apply to other peripheral accesses such as CD, DVD, tape, or removable memory, and to ROM accesses. The traces 202 provide the following information:

Stack trace #1 AB initiates disk access at timestamp 10
Stack trace #2 AC initiates disk access at timestamp 20
The disk access request #1 is completed at timestamp 25
Snapshot request #1 at timestamp 30
Stack trace #3 AD initiates disk access at timestamp 35
The disk access #2 is completed at timestamp 40
The disk access #3 is completed at timestamp 50
Snapshot request #2 at timestamp at timestamp 60
. . . execution continues, program ends execution at timestamp 100

In this situation, the embodiment starts by splitting 314 disk access #2 into two resource accesses—effectively creating two traces 202 from one trace:

2a: starts at timestamp 20 s ends at timestamp 30 s
2b: starts at timestamp 30 s and ends at timestamp 40

After assignment 316, accesses #1,2a are in the first snapshot set 216. "Accesses" here refers to traces 202. Actively aggregating 318 the first snapshot set yields aggregate trace AB with resource impact +15, aggregate trace AC with resource impact +10, and aggregate trace A with resource impact +25. Accesses #2b,3 are in the second snapshot set. Actively aggregating the second snapshot set yields aggregate trace AD with resource impact +15, aggregate trace AC with resource impact +10, and aggregate trace A with resource impact +25. Diffing 340 the two snapshot aggregations yields diff AB=−15, diff=AD+15, diff AC=+0, diff A=+0.

Using precursor aggregation 320 gives the following results. Accesses #1,2a are in the first precursor snapshot set 216. Aggregating the first precursor snapshot set yields aggregate trace AB with resource impact +15, aggregate trace AC with resource impact +10, aggregate trace A with resource impact +25. Thus far, the result is the same as for active aggregation.

However, accesses #1,2a,2b,3 are in the second precursor snapshot set, which differs from active aggregation. Aggregating the second precursor snapshot set yields aggregate trace AB with resource impact +15, aggregate trace AC with resource impact +20, aggregate trace AD with resource impact +15, and aggregate trace A with resource impact 50. Diffing the two precursor snapshot aggregations yields diff AB=+0, diff AC=+10, diff AD=+15, diff A=+25.

Heap Memory Usage Examples

As further illustrations, consider profiling a resource 204 which is allocated, such as heap memory 112. Heap memory is an example of a memory resource 138, 204. It can be freed after use and subsequently re-used after being re-allocated. In this example, the traces 202 provide the following information:

Stack trace #1 ABCDEF allocates 10 bytes at timestamp 10
Stack trace #2 ABCDEG allocates 5 bytes at timestamp 20
Stack trace #3 ABCDEF allocates 2 bytes at timestamp 30
Snapshot request #1 at timestamp 35
Stack trace #4 ABCDEF allocates 10 bytes at timestamp 40
The memory allocated by stack trace #2 is freed at timestamp 50
The memory allocated by stack trace #3 is freed timestamp 60
Stack trace #5 ABCK allocates 7 bytes at timestamp 62
Snapshot request #2 at timestamp 65
. . . execution continues, program ends execution at timestamp 100

Allocation traces #1,2,3 are in the first snapshot set 216, and allocation traces #1,4,5 are in the second snapshot set. Actively aggregating 318 the first snapshot set yields an aggregate trace with unified call chain ABCDEF having summed resource impact +12, aggregate trace ABCDEG with resource impact +5, and aggregate partial traces A, AB, ABC, ABCD, ABCDE each with resource impact +17. Actively aggregating 318 the second snapshot set yields aggregate trace ABCDEF with resource impact +20, aggregate trace ABCK with resource impact +7, aggregate partial trace ABCDE=+20, and aggregate partial traces A, AB, ABC, each with resource impact +27. "Partial" traces are traces in the aggregation but not in the underlying assigned 316 set 216 of traces 202; partial traces arise from call chain 212 unification 324. Diffing 340 the two snapshot aggregations yields ABCDEF diff=+8, ABCDEG diff=−5, ABCK=+7, A=AB=ABC=+10, ABCDE=+3.

Now consider results using 320 precursor assignment, a.k.a. "precursor aggregating" or "aggregating transient snapshot sets". Allocations #1,2,3 are in a first transient snapshot set 216, and allocations #1,2,3,4,5 are in the second snapshot set. Aggregating 320 the first transient snapshot set yields aggregate trace ABCDEF with resource impact +12, aggregate trace ABCDEG with resource impact +5, and aggregate trace ABCDE with resource impact +17. Aggregating 320 the second transient snapshot set yields aggregate trace ABCDEF with resource impact +22, aggregate trace ABCDEG with resource impact +5, aggregate trace ABCK with resource impact +7, aggregate trace ABCDE with resource impact +27, and aggregate trace AB with resource impact +34. Diffing 340 the two transient snapshot aggregations 222 yields ABCDEF diff=+10, ABCDEG diff=+0, ABCK=+7, AB=+17, ABCDE=+10.

More Memory Usage Examples

Here is a collection of traces 202 that includes various combinations of allocating 308 and freeing 310 a memory resource 138 relative to the time of a snapshot request 218, such as spanning or not spanning the request timestamp 220:
Stack trace #1 AB allocates 10 bytes at timestamp 10
The memory allocated by stack trace #1 is freed at timestamp 20
Stack trace #2 AC allocates 15 bytes at timestamp 30
Stack trace #3 AD allocates 20 bytes at timestamp 35
Snapshot request #1 at timestamp 40
The memory allocated by stack trace #3 is freed at timestamp 45
Stack trace #4 AE allocates 2 bytes at timestamp 50
Stack trace #5 AF allocates 8 bytes at timestamp 55
Stack trace #6 AG allocates 16 bytes at timestamp 56
The memory allocated by stack trace #4 is freed at timestamp 60
Snapshot request #2 at timestamp 70
The memory allocated by stack trace #6 is freed at timestamp 75
Stack trace #7 AH allocates 128 bytes at timestamp 80
. . . execution continues, program ends execution at timestamp 100

Under active aggregation 318, allocation traces #2,3 are in the first snapshot set, but allocation #1 is not in the first snapshot set because its lifespan 10-20 does not contain the timestamp of the first snapshot, 40. Aggregating 318 the first snapshot set yields aggregate trace A with resource impact +35, aggregate trace AC with resource impact +15, and aggregate trace AD with resource impact +20. Allocations #2,5,6 are in the second snapshot set, memory allocated 308 by trace #2 is not freed 310 during program execution but is implicitly freed at the end of the program giving allocation 2 a life time of 20-100. Allocations #3,4 are not in the second snapshot set as their lifespans 35-45 and 50-60 do not include the timestamp of the second snapshot, 70. Aggregating 318 the second snapshot set yields aggregate trace A with resource impact +39, aggregate AC with resource impact +15, aggregate trace AF with resource impact +8, and aggregate trace AG with resource impact +16. Diffing the two snapshot aggregations yields A diff=+4, AC diff=0, AD diff=−20, AF diff=+8, AG diff=+16.

Under precursor (a.k.a. transient) aggregation 320, allocations #1,2,3 are in the first transient snapshot set. Aggregating 320 the first transient snapshot set yields aggregate trace A with resource impact +45, aggregate trace AB with resource impact +10, aggregate trace AC with resource impact +15, and aggregate trace AD with resource impact +20. Allocations #1,2,3,4,5,6 are in the second snapshot set. Aggregating 320 the second transient snapshot yields aggregate trace A with resource impact +71, aggregate trace AB with resource impact +10, aggregate AC with resource impact +15, aggregate trace AD with resource impact +20, aggregate trace AE with resource impact +2, aggregate trace AF with resource impact +8, and aggregate trace AG with resource impact +16. Diffing 340 the two snapshot aggregations yields A diff=+26, AB diff=0, AC diff=0, AD diff=0, AE diff=+2, AF diff=+8, AG diff=+16.

Implemented Memory Usage Tool Example

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

With the foregoing in mind, the following discussion is derived from Microsoft® Visual Studio® Memory Usage Tool documentation. "Microsoft" and "Visual Studio" are registered marks of Microsoft Corporation. The Memory Usage Tool is a program implemented by Microsoft Corporation and provided as part of Microsoft® Visual Studio® 2013 Update 2 RC on or about Apr. 2, 2014. Aspects of the Memory Usage Tool program and/or documentation are consistent with or otherwise illustrate aspects of the embodiments described herein. However, it will be understood that Memory Usage Tool documentation and/or implementation choices do not necessarily either constrain or disclose the scope of such embodiments, and likewise that the Memory Usage Tool and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

The Memory Usage Tool supports development of commercial applications in computer programming languages such as C# ("C-Sharp"), the Visual Basic® language (mark of Microsoft Corporation), C++, and XAML. Efficient use of memory is generally desirable, for one or more of the following reasons. Some devices, particularly smart phones, enforce specific memory limits on an application 120 based on the size of the memory 112 in the device 102. Allocating more than the specified limit will cause an OutOfMemoryException or similar error and will result in application termination. Using a large amount of memory will increase the likelihood that an application gets terminated when its execution is suspended. Having applications quickly resume instead of starting over promotes a positive customer experience. Applications that allocate a large amount of memory are liable to slow down the system they run on and cause reliability issues. Allocating a large amount of memory within a short period of time can cause the application to stop responding.

One Memory Usage Tool implementation includes a Performance and Diagnostics hub which is opened from a Debug→Performance and Diagnostics (ALT+F2) menu. The implementation supports three profiling modes for the Memory Usage Tool. A user can set the mode using a Settings link available next to the Memory Usage Tool prior to starting a profiling session. In a Managed mode used for managed applications, the Memory Usage profiler tool 124 only collects managed heap information by default. Managed heap profiling is done by capturing a set of Common Language Runtime Event Tracing for Windows events in the profiler. In a Native mode used for native applications, the Memory Usage profiler tool 124 only collects native heap information. For collecting native heap information, the implementation enables stack tracing and the collection of Event Tracing for Windows heap traces, which are very verbose and will create large diagsession files. In a Mixed mode, information for both the managed and native heap is collected by the Memory Usage profiler tool 124. This is primarily used to analyze memory issues in hybrid applications. Because both managed and native allocations are being tracked, the diagsession files created are large.

For the purpose of this example, assume the profiling mode is Mixed and the application 120 being profiled has both native code 128 and managed components 130. After the tool starts, it displays a ruler. The ruler shows events of interest that happen in the application 120 during the profiling session as well as the session timeline. Events that happen concurrently or within a very short period of time might get merged into a single mark. Log messages may show up in the ruler. When the application starts up, the Memory Usage Tool starts displaying a live graph of the memory 112 consumed by the application. A Private Bytes counter indicates the total amount of memory that a process has allocated, not including memory shared with other processes. This is a metric that is also used by some operating systems to monitor the memory consumption of an application. In this implementation, a red dotted bar may appear over the live graph, indicating the maximum memory that can be allocated by an application on the device 102 in question.

In this implementation, the Memory Usage Tool GUI 234 also includes a "Take Snapshot" button. This implementation is a snapshot based profiler 124 which means a developer can explicitly take snapshots in order to capture the state of the application memory at the snapshot's point in time. When the Take Snapshot button is clicked, the following actions are taken by the tool. The tool asks the Common Language Runtime 122 for heap information, which in turn causes the runtime to do a garbage collection and generate heap information via ETW events. The time stamp 220 at the point of command invocation is taken to determine the set of allocations and frees in the native heap till that point. A screenshot of the application's display 136 is taken to help relate the state of the application with its memory consumption across profiling sessions.

After the application finishes, or the developer stops profiling expressly, the profiler 124 analyzes the results and populates snapshot tiles of the GUI with the following information:

Managed Heap size: The total size of the managed heap at that point in the application's lifetime 126.
Managed Object count: The total number of objects 330 in the managed heap.
Size difference: The first snapshot is treated as the baseline and this value is the difference in the size between successive snapshots.
Count difference: The first snapshot is treated as the baseline and this value is the difference in the object counts between successive snapshots.

The implementation includes functionality specifically for analyzing the Managed Heap. Opening a Count Difference link shows that managed heap information is aggregated by the type of the objects in the heap. As to a Paths to Root and Referenced Objects/Types item, after selecting a type or an instance, a user can see its garbage collection roots as well as its references. This helps users understand why certain types or instances are not being collected during a garbage collection run. An object can have multiple roots and the leaf nodes in the tree view are the garbage collection roots. As to a Just My Code item, a runtime during application boot up and execution might allocate a number of objects on its own behalf. A Just My Code filter, which is set by default, removes these runtime-specific objects from the list and folds their cost into their roots thus reducing the number of system objects visible in the list. As to a Collapse small objects item, there might be large number of objects in the managed heap. Sifting through this data can be time consuming and sometimes does not help in any way in solving the problem. Collapse small objects is a filter which is set by default that removes relatively small objects (objects whose size is less than 0.5% of the total heap) from the list and associates their cost to their roots.

Turning now to native memory analysis and troubleshooting, the Memory Usage Tool includes a Heap snapshot view that shows the following information for the snapshots:
Native Heap size: The total size of the native heap at that point in the applications lifetime.
Native Heap allocation count: The total number of allocations in the native heap.
Size difference: The first snapshot (a.k.a. aggregation) is treated as the baseline and this value is the difference in the size between successive snapshots.
Count difference: The first snapshot is treated as the baseline and this value is the difference in the allocation counts between successive snapshots.

This implementation of the Memory Usage Tool includes some functionality specific to native heap profiling. Upon opening a Count Difference link on a snapshot, information in the native heap view is aggregated by the frames in the call stack. Selecting a frame will show all the allocations that can be attributed to that function in the allocation list. In a Callers and Callees view a developer can choose to switch between Callers and Callees while viewing the aggregated data. The Callers view brings the function 132 that allocated memory to the front while the Callees view helps developers 104 trace allocations from the root of the call stack 134. By default, the native heap view is set to Callers view and the developer can change this by using an Aggregate by toggle button. As to Just My Code functionality, by default the tool pre-applies the Just My Code filter when opening a native details view. This brings user code front and center. Routine names are gotten and resolved (i.e., attached to stack traces) by code using a connection to a symbol server or other source of symbol table files.

Freed allocations can be informative while troubleshooting application 120 responsiveness issues resulting from a large number of transient allocations happening in a short interval. In this implementation, a user can select an Include Freed Allocations filter which forces the tool to aggregate 320 freed allocations.

Common allocation functions like RTLAllocateHeap can be eliminated from the call stack as redundant. A default cull list can be overridden by a user-provided cull list.

This implementation supports searching for specific call 214 frames in the native heap view. This can be accomplished by using a Search box and using either the 'Enter' or the 'F3' key to search for successive frames that match user input.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 and/or FIG. 4 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process for inspecting usage of a computational resource, including:
    obtaining in a digital memory resource usage stack traces recorded during execution of a software program in a computing system, the resource usage stack traces having been recorded when one or more of the following occurred: the computational resource was sampled, a portion of the computational resource was allocated, or a portion of the computational resource was freed, wherein each stack trace which was recorded when the computational resource was sampled or when a portion of the computational resource was allocated has a resource impact and at least one constituent call chain;
    unifying call chains of a plurality of resource usage stack traces by identifying instances of at least one shared call chain in at least two of the resource usage stack traces and by summing the respective resource impacts of each instance of the shared call chain; and
    displaying at least one unified call chain resource impact.

2. The process of claim 1, wherein at least some of the resource usage stack traces were recorded when the computational resource was sampled, each stack trace has a lifespan which has a duration, and at least one of the following conditions holds: the resource usage stack traces each have the same resource impact, or at least one resource usage stack trace has a resource impact which depends on the duration of the resource usage stack trace's lifespan.

3. The process of claim 1, wherein at least one of the resource usage stack traces was recorded when a portion of the computational resource was allocated.

4. The process of claim 3, wherein the computational resource comprises memory allocated by a native code portion of the software program.

5. The process of claim 1, wherein the process further comprises:
    noting at least one snapshot request, each snapshot request having a timestamp indicating a position of the snapshot request within an execution period of the software program; and
    assigning resource usage stack traces to a snapshot set of the snapshot request.

6. The process of claim 5, wherein each stack trace which was recorded when the computational resource was sampled or when a portion of the computational resource was allocated has a lifespan, each resource usage stack trace's lifespan has a duration, and resource usage stack traces are assigned to the snapshot set using an active aggregation in that a resource usage stack trace is assigned to the snapshot set only if the snapshot request is made during the resource usage stack trace's lifespan.

7. The process of claim 5, wherein each stack trace which was recorded when the computational resource was sampled or when a portion of the computational resource was allocated has a lifespan, each resource usage stack trace's lifespan has a start, and resource usage stack traces are assigned to the snapshot set using a precursor aggregation in that a resource usage stack trace is assigned to the snapshot set only if the snapshot request was made after the start of the resource usage stack trace's lifespan.

8. The process of claim 1, wherein each stack trace which was recorded when the computational resource was sampled or when a portion of the computational resource was allocated has a lifespan, and the process comprises:
noting at least two snapshot requests, each snapshot request having a timestamp indicating a position of the snapshot request within an execution period of the software program;
for each of the at least two snapshot requests, assigning resource usage stack traces to a respective snapshot set of that snapshot request based on resource usage stack trace lifespans and the timestamp of that snapshot request;
for each of the at least two snapshot sets, unifying call chains of the resource usage stack traces of that snapshot set by identifying instances of at least one shared call chain in at least two of the resource usage stack traces and by summing the respective resource impacts of each instance of the shared call chain, thereby producing a snapshot aggregation for each of at least two snapshot requests, each snapshot aggregation including unified call chains with respective summed resource impacts;
differencing at least two snapshot aggregations by subtracting the unified call chain summed resource impacts of one snapshot aggregation from the respective unified call chain summed resource impacts of another snapshot aggregation; and
displaying at least a portion of at least one result of the differencing.

9. The process of claim 1, wherein the computational resource comprises digital memory, the software program includes objects which are defined with typing information in a high-level programming language, at least one of the resource usage stack traces records an allocation of a portion of digital memory to hold an object, and the process is performed without using typing information of that object.

10. A computer-readable storage medium configured with data and with instructions that when executed by at least one processor causes the processor(s) to perform a technical process for inspecting usage of a computational resource, the process comprising:
obtaining in a digital memory resource usage stack traces recorded during execution of a software program in a computing system, the resource usage stack traces having been recorded when one or more of the following occurred: the computational resource was sampled, a portion of the computational resource was allocated, or a portion of the computational resource was freed, wherein each stack trace which was recorded when the computational resource was sampled or when a portion of the computational resource was allocated has a lifespan and a resource impact and at least one constituent call chain;
unifying call chains of the resource usage stack traces by identifying instances of at least one shared call chain in at least two of the resource usage stack traces and by summing the respective resource impacts of each instance of the shared call chain; and
identifying, by use of at least one unified call chain, at least one cause of an unexpected growth in computational resource usage.

11. The computer-readable storage medium of claim 10, wherein the computational resource is sampled by a routine identified in a resource usage stack trace, the lifespan of the resource usage stack trace begins when the computational resource is sampled, and the resource usage stack trace lifespan ends at a snapshot request.

12. The computer-readable storage medium of claim 10, wherein a portion of the computational resource is allocated by a routine identified in a resource usage stack trace, the lifespan of the resource usage stack trace begins when the portion is allocated, and the resource usage stack trace lifespan ends when the allocated portion is freed.

13. The computer-readable storage medium of claim 10, wherein the process comprises obtaining resource usage stack traces which record at least one of the following: memory usage by a native code portion of the software program, memory usage by a managed code portion of the software program, allocated heap memory usage, processor usage, thread activity, nonvolatile storage subsystem usage, network interface usage, electrical power usage, peripheral device usage, allocated resource usage, sampled uniformly weighted resource usage, or sampled proportionately weighted resource usage.

14. The computer-readable storage medium of claim 10, wherein the computational resource is a memory resource having portions allocated in some routine calls during the execution period and having portions freed in other routine calls during the execution period, and the process comprises obtaining resource usage stack traces for all of the routine calls in which a portion of the computational resource was freed, but obtaining resource usage stack traces for only some of the routine calls in which a portion of the computational resource was allocated.

15. A computer system comprising:
a logical processor;
a memory in operable communication with the logical processor;
resource usage stack traces residing in the memory, the resource usage stack traces having constituent call chains and associated resource impacts which indicate one or more of the following events during execution of a software program: a computational resource was sampled, a portion of a computational resource was allocated, or a portion of a computational resource was freed;
and
one or more unified call chains with respective summed resource impacts which are consistent with the resource usage stack traces, constituent call chains, and associated resource impacts.

16. The system of claim 15, further comprising call chain interval resource impact aggregation differencing code ("CCIRIAD") code residing in the memory, which upon execution by the logical processor(s) performs the following:
for each of at least two snapshot requests, assigns resource usage stack traces to a respective snapshot set of that snapshot request based on resource usage stack trace lifespans and the timestamp of that snapshot request; and for each of the at least two snapshot sets, unifies call chains of the resource usage stack traces of that snapshot set by identifying instances of at least one shared call chain in at least two of the resource usage stack traces and by summing respective resource impacts of each instance of the shared call chain, thereby producing a snapshot aggregation for each of at least two snapshot requests, each snapshot aggregation including unified call chains with respective summed resource impacts.

17. The system of claim 16, wherein the system is further characterized in at least one of the following ways:

each resource usage stack trace's lifespan has a duration, and resource usage stack traces are assigned to the snapshot set by CCIRIAD code using an active aggregation in that a resource usage stack trace is assigned to the snapshot set only if the snapshot request is made during the resource usage stack trace's lifespan;

each resource usage stack trace's lifespan that crosses a snapshot boundary is split into stack traces which do not cross any snapshot boundary; or each resource usage stack trace's lifespan has a start, and resource usage stack traces are assigned to the snapshot set by CCIRIAD code using a precursor aggregation in that a resource usage stack trace is assigned to the snapshot set only if the snapshot request was made after the start of the resource usage stack trace's lifespan.

18. The system of claim 15, further comprising a user interface display of any differences between at least two snapshot aggregations, the differences computed by subtracting unified call chain summed resource impacts of one snapshot aggregation from respective unified call chain summed resource impacts of another snapshot aggregation.

19. The system of claim 15, wherein the system is further characterized in at least two of the following ways:

the computational resource comprises memory allocated by a native code portion of the software program;

the computational resource comprises digital memory, the software program includes objects which are defined with typing information in a high-level programming language, at least one of the resource usage stack traces records an allocation of a portion of digital memory to hold an object, and the process is performed without using typing information of that object;

a portion of the computational resource is allocated by a routine identified in a resource usage stack trace, the lifespan of the resource usage stack trace begins when the portion is allocated, and the resource usage stack trace lifespan ends when the allocated portion is freed; or at least one snapshot aggregation residing in the system includes at least one unified call chain produced from at least two different resource usage stack traces.

20. The system of claim 15, wherein the system is further characterized in at least two of the following ways:

the computational resource is sampled by a routine identified in a resource usage stack trace, the lifespan of the resource usage stack trace begins when the computational resource is sampled, and the resource usage stack trace lifespan ends at the position of a next snapshot request;

a snapshot aggregation denoted here as A1 includes a unified call chain C that is not in a snapshot aggregation denoted here as A2, and the process comprises implying C in A2 with a resource impact of zero; or the resource usage stack traces indicate at least one of the following: memory usage by a native code portion of the software program, memory usage by a managed code portion of the software program, heap memory usage, processor usage, thread activity, nonvolatile storage subsystem usage, network interface usage, electrical power usage, peripheral device usage, allocated resource usage, sampled uniformly weighted resource usage, or sampled proportionately weighted resource usage.

* * * * *